US012420517B2

(12) United States Patent
Högblom et al.

(10) Patent No.: US 12,420,517 B2
(45) Date of Patent: Sep. 23, 2025

(54) METHOD FOR DRY-FORMING CELLULOSE PRODUCTS FROM A CELLULOSE BLANK STRUCTURE IN A PRODUCT FORMING UNIT AND A PRODUCT FORMING UNIT

(71) Applicant: PulPac AB, Västra Frölunda (SE)

(72) Inventors: Olle Högblom, Gothenburg (SE); Ove Larsson, Västra Frölunda (SE); Martin Ljungberg, Gothenburg (SE); Edward Guidotti, Gothenburg (SE); Björn Arlerot, Gothenburg (SE); Patrik Larsson, Kärna (SE)

(73) Assignee: PulPac AB, Västra Frölunda (SE)

( * ) Notice: Subject to any disclaimer, the term of this patent is extended or adjusted under 35 U.S.C. 154(b) by 58 days.

(21) Appl. No.: 18/285,623

(22) PCT Filed: Apr. 8, 2022

(86) PCT No.: PCT/EP2022/059512

§ 371 (c)(1),
(2) Date: Oct. 4, 2023

(87) PCT Pub. No.: WO2022/218873

PCT Pub. Date: Oct. 20, 2022

(65) Prior Publication Data

US 2024/0181740 A1 Jun. 6, 2024

(30) Foreign Application Priority Data

Apr. 15, 2021 (WO) ................. PCT/EP2021/059810
Apr. 15, 2021 (WO) ................. PCT/EP2021/059811
Dec. 23, 2021 (SE) ................................... 2151618-2

(51) Int. Cl.
*B31F 1/00* (2006.01)
*B27N 1/00* (2006.01)
(Continued)

(52) U.S. Cl.
CPC .............. *B31F 1/0077* (2013.01); *B27N 1/00* (2013.01); *B27N 3/007* (2013.01); *B27N 3/04* (2013.01);
(Continued)

(58) Field of Classification Search
CPC ......... B31F 1/0077; B27N 1/00; B27N 3/007; B27N 3/04; B27N 3/18; B27N 5/00;
(Continued)

(56) References Cited

U.S. PATENT DOCUMENTS 3,071,805 A * 1/1963 Merkle ................ B30B 15/306 100/295
3,801,434 A 4/1974 Carlsson
(Continued)

FOREIGN PATENT DOCUMENTS

DE 1054228 B 4/1959
DE 9419302 U1 2/1995
(Continued)

OTHER PUBLICATIONS

International Search Report and Written Opinion, International Application No. PCT/EP2022/059512, mailed Jul. 21, 2022.
(Continued)

*Primary Examiner* — Veronica Martin
(74) *Attorney, Agent, or Firm* — Sage Patent Group

(57) ABSTRACT

Method for dry-forming cellulose products from a cellulose blank structure in a product forming unit. The product forming unit includes a blank dry-forming module and a pressing module. The cellulose blank structure is air-formed in the blank dry-forming module onto a forming wire. The pressing module includes one or more forming molds for forming the cellulose products from the cellulose blank
(Continued)

structure in a pressing operation. The method includes arranging the forming wire in a stationary mode during the pressing operation.

23 Claims, 8 Drawing Sheets

(51) Int. Cl.

| | |
|---|---|
| ***B27N 3/00*** | (2006.01) |
| ***B27N 3/04*** | (2006.01) |
| ***B27N 3/18*** | (2006.01) |
| ***B27N 5/00*** | (2006.01) |
| ***B30B 1/10*** | (2006.01) |
| ***B30B 9/28*** | (2006.01) |
| ***B30B 15/30*** | (2006.01) |
| ***B31B 50/00*** | (2017.01) |
| ***B31B 50/10*** | (2017.01) |
| ***B31B 50/59*** | (2017.01) |

(52) U.S. Cl.
CPC ................. *B27N 3/18* (2013.01); *B27N 5/00* (2013.01); *B30B 1/10* (2013.01); *B30B 9/28* (2013.01); *B30B 15/30* (2013.01); *B30B 1/103* (2013.01); *B31B 50/006* (2017.08); *B31B 50/102* (2017.08); *B31B 50/59* (2017.08)

(58) Field of Classification Search
CPC .. B30B 1/10; B30B 9/28; B30B 15/30; B31B 50/102; B31B 50/59; B31B 50/006
See application file for complete search history.

(56) References Cited

U.S. PATENT DOCUMENTS

| | | | | |
|---|---|---|---|---|
| 4,024,014 | A | 5/1977 | Akerson | |
| 4,311,555 | A | 1/1982 | Reinhall | |
| 4,726,881 | A | 2/1988 | Schultz | |
| 5,643,384 | A | 7/1997 | Okabe | |
| 2007/0065531 | A1 | 3/2007 | Engleder | |
| 2019/0070819 | A1 * | 3/2019 | Larsson | .................. B29C 49/22 |

FOREIGN PATENT DOCUMENTS

| | | | | |
|---|---|---|---|---|
| EP | 1859914 | A1 | 11/2007 | |
| EP | 3199322 | A1 | 8/2017 | |
| EP | 3381645 | A1 | 10/2018 | |
| GB | 675652 | A | 7/1952 | |
| GB | 820327 | A | 9/1959 | |
| GB | 890132 | A | 2/1962 | |
| JP | 2002/172592 | A | 6/2002 | |
| JP | 202019048 | A | 2/2020 | |
| SE | 1750313 | A1 * | 10/2018 | ............... D04H 1/26 |
| SE | 543410 | C2 | 1/2021 | |
| WO | WO-2017/160218 | A1 | 9/2017 | |
| WO | WO-2019/209160 | A1 | 10/2019 | |
| WO | WO-2021/001276 | A1 | 1/2021 | |

OTHER PUBLICATIONS

International Search Report and Written Opinion, International Application No. PCT/EP2021/059810, mailed Jan. 4, 2022.
International Search Report and Written Opinion, International Application No. PCT/EP2021/059811, mailed Jan. 19, 2022.
International Search Report and Written Opinion, International Application No. PCT/EP2022/059510, mailed Jul. 29, 2022.
European Search Report, European Patent Application No. 23209517.4, dated Mar. 7, 2024.

* cited by examiner

METHOD FOR DRY-FORMING CELLULOSE PRODUCTS FROM A CELLULOSE BLANK STRUCTURE IN A PRODUCT FORMING UNIT AND A PRODUCT FORMING UNIT

TECHNICAL FIELD

The present disclosure relates to a method for dry-forming cellulose products from a cellulose blank structure in a product forming unit. The product forming unit comprises a blank dry-forming module and a pressing module. The cellulose blank structure is air-formed in the blank dry-forming module. The pressing module comprises one or more forming molds for forming the cellulose products from the cellulose blank structure. The disclosure further relates to a product forming unit.

BACKGROUND

Cellulose fibers are often used as raw material for producing or manufacturing products. Products formed of cellulose fibers can be used in many different situations where there is a need for having sustainable products. A wide range of products can be produced from cellulose fibers and a few examples are disposable plates and cups, cutlery, lids, bottle caps, coffee pods, hangers, and packaging materials.

Forming molds are commonly used when manufacturing cellulose products from cellulose fiber raw materials, and traditionally the cellulose products are wet-formed. A material commonly used for wet-forming cellulose fiber products is wet molded pulp. Wet molded pulp has the advantage of being considered as a sustainable packaging material, since it is produced from biomaterials and can be recycled after use. Consequently, wet molded pulp has been quickly increasing in popularity for different applications. Wet molded pulp articles are generally formed by immersing a suction forming mold into a liquid or semi liquid pulp suspension or slurry comprising cellulose fibers, and when suction is applied, a body of pulp is formed with the shape of the desired product by fiber deposition onto the forming mold. With all wet-forming techniques, there is a need for drying of the wet molded product, where the drying is a very time and energy consuming part of the production. The demands on aesthetical, chemical and mechanical properties of cellulose products are increasing, and due to the properties of wet-formed cellulose products, the mechanical strength, flexibility, freedom in material thickness, and chemical properties are limited. It is also difficult in wet-forming processes to control the mechanical properties of the products with high precision.

One development in the field of producing cellulose products is the forming of cellulose fibers in a dry-forming process, without using wet-forming. Instead of forming the cellulose products from a liquid or semi liquid pulp suspension or slurry, an air-formed cellulose blank structure is used. The air-formed cellulose blank structure is inserted into forming molds and during the forming of the cellulose products the cellulose blank structure is subjected to a high forming pressure and a high forming temperature in the forming molds.

Product forming units are used when dry-forming the cellulose products, and the product forming units commonly use a pressing module comprising the forming molds. Other modules and components are arranged in connection to the pressing module in the product forming unit, such as for example feeding modules and blank dry-forming modules. The product forming units are normally using high capacity pressing modules, such as vertical hydraulic pressing units commonly used for forming other materials, such as steel plates, due to the need for establishing high product forming pressure in the forming molds. Blank dry-forming modules are commonly sourced from the hygiene industry, such as forming modules from diaper production units. The product forming units used are due to the type of standard modules used, and high number of modules and components involved occupying large spaces in manufacturing facilities.

One drawback of using standard modules developed for other purposes is the required engineering work to integrate the different modules, from different industries, into a product forming unit for manufacturing cellulose products from an air-formed cellulose blank structure. Such projects can typically require six to twelve months with several person-years behind each product forming unit, normally ending up in custom-made industrial lines with less value for reproduction or scale-up. The integration of different modules into a product forming unit from separately purchased modules constitutes a hurdle to go over to dry-forming for many converters. A complete, fully integrated, standardized production forming unit ready to purchase, ship, install and run, is therefore highly demanded.

There is thus a need for an improved method for manufacturing cellulose products from an air-formed cellulose blank structure in a product forming unit, with a more compact layout and construction.

SUMMARY

An object of the present disclosure is to provide a method for dry-forming cellulose products from a cellulose blank structure in a product forming unit, and a product forming unit, where the previously mentioned problems are avoided. This object is at least partly achieved by the features of the independent claims. The dependent claims contain further developments of the method for dry-forming cellulose products from a cellulose blank structure in a product forming unit.

The disclosure concerns a method for dry-forming cellulose products from a cellulose blank structure in a product forming unit. The product forming unit comprises a blank dry-forming module and a pressing module. The cellulose blank structure is air-formed in the blank dry-forming module onto a forming wire. The pressing module comprises one or more forming molds for forming the cellulose products from the cellulose blank structure in a pressing operation. The method comprises the step: arranging the forming wire in a stationary mode during the pressing operation.

Advantages with these features are that due to the modular configuration of the product forming unit, a compact layout can be achieved. The stationary mode is providing an efficient operation of the product forming unit and is allowing a very compact layout, since there is no need for buffering the cellulose blank structure between the blank dry-forming module and the pressing module. In traditional configurations, a buffering module is used for feeding a continuously formed cellulose blank structure from the blank dry-forming module to the intermittently operating pressing module. The buffering module is occupying a large space in the product forming unit, and through the design with the stationary mode during the pressing operation the buffering module could be omitted. The blank dry-forming module is enabling a forming of the cellulose blank structure in close connection to the pressing module, without the need for pre-fabricating the cellulose blank structure. Further, the operation of the product forming unit is efficient with cellulose raw material used as input material for in-line production of the cellulose blank structure. During the pressing operation, the one or more forming molds are operated for forming cellulose products from the cellulose blank structure. The pressing operation starts when the one or more forming molds are moved from a stationary position. In this position, one or more cooperating mold parts are arranged at a distance from each other and the cellulose blank structure can be fed into the one or more forming molds in a forming position between the mold parts. Thereafter, the mold parts are moved towards each other for applying a forming pressure onto the cellulose blank structure and then moved away from each other back to the stationary position. When the mold parts have reached the stationary position again, the pressing operation is completed. The pressing operation is thus defined as a pressing cycle during which the cellulose blank structure is exerted to a forming pressure, and the duration of the pressing operation is calculated from the start of the movements of the one or more mold parts from the stationary position until they have reached the stationary position again.

In one embodiment, in the stationary mode the forming wire is arranged in a standstill state. The duration of the standstill state is synchronized with the duration of the pressing operation such that the standstill state is occurring during the pressing operation. The forming wire may be arranged in the standstill state at any time during pressing operation, and the time duration of the standstill state may be only a part of the time duration of the pressing operation, or alternatively the full pressing operation.

In one embodiment, the stationary mode is followed by a transporting mode. In the transporting mode, the forming wire is arranged in a moving state. The method further comprises the step: moving the air-formed cellulose blank structure away from the blank dry-forming module by the forming wire in the moving state. The moving state is synchronized with the feeding of the air-formed cellulose blank structure to the pressing module for an efficient intermittent transporting operation of the cellulose blank structure from the blank dry-forming module to the pressing module.

In one embodiment, the moving state is at least partly occurring between two subsequent pressing operations. In this way, the moving state is at least partly occurring when the one or more forming molds are in the stationary position, for an efficient operation of the product forming unit.

In one embodiment, the cellulose blank structure is air-formed in the dry-forming module into a discrete cellulose blank, or the cellulose blank structure is air-formed in the dry-forming module into a continuous cellulose blank.

In one embodiment, the method further comprises the steps: forming the cellulose products from the cellulose blank structure in the one or more forming molds by heating the cellulose blank structure to a forming temperature, and pressing the cellulose blank structure with a forming pressure in the pressing operation.

In one embodiment, the forming temperature $T_F$ is in the range of 100-300° C., preferably in the range of 100-200° C., and the forming pressure $P_F$ is in the range of 1-100 MPa, preferably in the range of 4-20 MPa. These parameters are providing an efficient forming of the cellulose products, where strong hydrogen bonds are formed.

In one embodiment, the pressing operation is a single pressing operation. With the single pressing operation is meant that the cellulose product is formed from the cellulose blank structure in one single pressing step in the pressing module. In the single pressing operation, a forming pressure and a forming temperature are not applied to the cellulose blank structure in two or more repeated or subsequent pressing steps.

In one embodiment, the method further comprises the steps: transporting the air-formed cellulose blank structure from the blank dry-forming module to the pressing module. Any suitable feeding means may be used for an efficient transportation, such as feeding belts or feeding rollers.

In one embodiment, the cellulose blank structure is intermittently transported from the blank dry-forming module to the pressing module. The intermittent feeding is securing an efficient transportation of the cellulose blank structure into the pressing module, which is operating intermittently.

In one embodiment, the cellulose blank structure is intermittently transported from the blank dry-forming module by the forming wire in a first feeding direction, and intermittently transported to the pressing module in a second feeding direction. The second feeding direction differs from the first feeding direction. The differing feeding directions are enabling a compact layout of the product forming unit.

In one embodiment, the first feeding direction is opposite to, or essentially opposite to, the second feeding direction. This enables an efficient feeding of the cellulose blank structure, where the cellulose blank structure is redirected from the first feeding direction to the second feeding direction, where the directions are opposite to each other, or essentially opposite to each other. The differing feeding directions enable the modules to be integrated into one single unit or machinery possible to ship in a freight container, place on a converter's plant floor, connect and start production in a few months with no or very little module engineering skill required from the converter. Further advantages are that the differing feeding directions enable a more compact layout and construction of the product forming unit. With this configuration, the modules can be positioned in relation to each other in a non-conventional manner for an efficient and compact layout. Moreover, the integrated module design enables the weight of the production forming unit to be several times less than today's units with aligned discrete separately purchased modules into a custom-made industrial line. The weight of machinery commonly relates to the purchase price, why this solution also lowers the investment costs with several times for the converter. The lower investment costs enable a faster conversion to products made of cellulose raw materials instead of plastic materials.

In one embodiment, the first feeding direction is an upwards direction and the second feeding direction is a downwards direction. This enables a smart and efficient layout of the product forming unit, where the unit can be built in a vertical direction for a compact layout.

In one embodiment, the method further comprises the steps: providing a cellulose raw material and feeding the cellulose raw material to the blank dry-forming module; air-forming the cellulose blank structure from the cellulose raw material in the blank dry-forming module onto the forming wire. The blank dry-forming module is enabling a forming of the cellulose blank structure in close connection to the pressing module, without the need for pre-fabricating the cellulose blank structure. Due to the modular configuration of the product forming unit, a compact layout can be achieved. Further, the operation of the product forming unit is efficient with the cellulose raw material used as input material for in-line production of the cellulose blank structure.

In one embodiment, the blank dry-forming module further comprises a mill and a forming chamber. The forming wire is arranged in connection to the forming chamber. The method further comprises the steps: separating cellulose fibers from the cellulose raw material in the mill and distributing the separated cellulose fibers into the forming chamber onto the forming wire for air-forming the cellulose blank structure. The mill is configured for separating cellulose fibers from a cellulose raw material, and the forming chamber is configured for efficiently distributing the separated cellulose fibers onto the forming wire for air-forming the cellulose blank structure.

In one embodiment, the method further comprises the steps: continuously operating the mill; and continuously feeding the cellulose raw material to the mill, or intermittently feeding the cellulose raw material to the mill.

In one embodiment, the forming wire comprises a forming section arranged in connection to a forming chamber opening of the forming chamber. The method further comprises the step: air-forming the cellulose blank structure onto the forming section. The forming section is controlling the forming of the cellulose blank structure onto the forming wire, and the forming section may be used for shaping the cellulose blank structure into suitable configurations.

In one embodiment, the forming section is extending in an upwards blank forming direction. The method further comprises the steps: air-forming the cellulose blank structure onto the forming section, and transporting the formed cellulose blank structure by the forming wire in the upwards blank forming direction. The non-conventional upwards extension of the forming section is enabling a compact layout of the product forming unit, since the cellulose blank structure can be formed in an upwards direction for direct transportation to the pressing module.

In one embodiment, the forming section is extending in a horizontal blank forming direction. The method further comprises the steps: air-forming the cellulose blank structure onto the forming section, and transporting the formed cellulose blank structure by the forming wire in the horizontal blank forming direction. This conventional orientation is providing an alternative for an efficient forming process.

In one embodiment, the forming wire has a first side facing the forming chamber and a second side facing a vacuum box arranged in connection the forming chamber. The vacuum box is configured for controlling the flow of air in the forming chamber and for distributing the separated cellulose fibers onto the forming wire. The method further comprises the steps: air-forming the cellulose blank structure onto the first side of the forming wire; applying a negative pressure onto the second side for securing attachment of the cellulose fibers onto the first side.

In one embodiment, the product forming unit comprises a blank recycling module. The method further comprises the step: transporting residual parts of the cellulose blank structure from the pressing module to the blank dry-forming module. The transportation of the residual parts is securing that non-used parts of the cellulose blank structure can be re-used.

In one embodiment, the blank recycling module comprises a recycling compacting unit. The method further comprises the step: compacting the residual parts of the cellulose blank structure in the recycling compacting unit upon transportation from the pressing module to the blank dry-forming module. By compacting the residual parts, an efficient operation in the mill is achieved.

In one embodiment, the pressing module is a cellulose product toggle pressing module for forming the cellulose products from the cellulose blank structure. The method further comprises the steps: providing the cellulose product toggle pressing module having a toggle press and the one or more forming molds, wherein the toggle press includes a pressing member movably arranged in a pressing direction, a toggle-mechanism connected to the pressing member, a pressing actuator arrangement connected to the toggle-mechanism, and an electronic control system operatively connected to the pressing actuator arrangement, and wherein the one or more forming molds each includes a movable first mold part attached to the pressing member and a stationary second mold part; installing the toggle press with the pressing direction of the pressing member arranged primarily in a horizontal direction, specifically with the pressing direction of the pressing member arranged within degrees from the horizontal direction, and more specifically with the pressing direction in parallel with the horizontal direction; feeding the cellulose blank structure into a pressing area defined by the first and second, spaced apart, mold parts; controlling operation of the pressing actuator arrangement by means of the electronic control system for driving the pressing member using the toggle-mechanism in the pressing direction and forming the cellulose products from the cellulose blank structure by pressing each first mold part against the stationary second mold part. The primarily horizontal orientation of the toggle press enables a low build height of the cellulose product forming unit, and a non-straight material flow of the cellulose blank structure from the blank dry-forming module to the pressing module. Since a continuous web of cellulose fiber material is typically supplied to the pressing module at about right angles to the pressing direction of the pressing module, a primarily horizontal orientation of the toggle press is typically associated with a primarily vertically arranged supply flow of the continuous cellulose blank structure. Consequently, it is clear that a primarily horizontally arranged pressing module is highly beneficial when developing a compact cellulose product forming unit for efficient production of the cellulose products with the pressing member arranged primarily in a horizontal direction, specifically with the pressing direction of the pressing member arranged within 20 degrees from the horizontal direction, and more specifically with the pressing direction in parallel with the horizontal direction.

The disclosure further concerns a product forming unit for dry-forming cellulose products from a cellulose blank structure. The product forming unit comprises a blank dry-forming module and a pressing module. The cellulose blank structure is air-formed in the blank dry-forming module onto a forming wire. The pressing module comprises one or more forming molds configured for forming the cellulose products from the cellulose blank structure in a pressing operation. The blank dry-forming module is configured for arranging the forming wire in a stationary mode during the pressing operation. The stationary mode is providing an efficient operation of the product forming unit and is allowing a very compact layout, since there is no need for buffering the cellulose blank structure between the blank dry-forming module and the pressing module. The blank dry-forming module is enabling a forming of the cellulose blank structure in close connection to the pressing module, without the need for pre-fabricating the cellulose blank structure. Further, the operation of the product forming unit is efficient with cellulose raw material used as input material for in-line production of the cellulose blank structure.

BRIEF DESCRIPTION OF DRAWINGS

The disclosure will be described in detail in the following, with reference to the attached drawings, in which.

DETAILED DESCRIPTION OF DRAWINGS

Various aspects of the disclosure will hereinafter be described in conjunction with the appended drawings to illustrate and not to limit the disclosure, wherein like designations denote like elements, and variations of the described aspects are not restricted to the specifically shown embodiments, but are applicable on other variations of the disclosure.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

Figure 1:
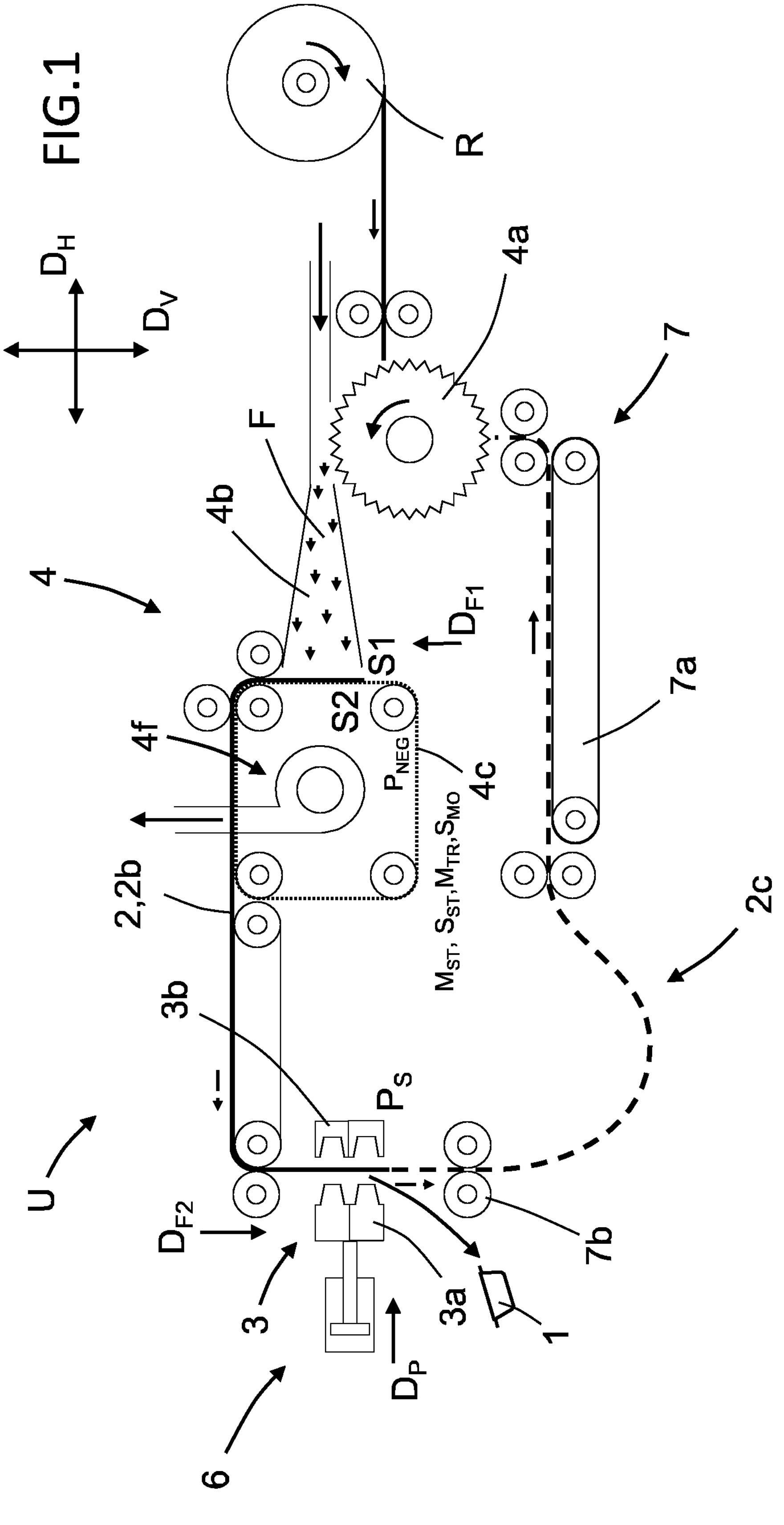
FIG. 1 shows schematically, in a side view, a product forming unit according to the disclosure.

FIG. 1 schematically show a product forming unit U for dry-forming cellulose products 1 from an air-formed cellulose blank structure 2. The product forming unit U has extensions in a horizontal direction or plane $D_H$ and a vertical direction $D_V$. The product forming unit U comprises a blank dry-forming module 4 and a pressing module 6, as will be further described below. The cellulose products 1 are dry-formed from the cellulose blank structure 2 in the product forming unit U. The pressing module 6 comprises one or more forming molds 3 for forming the cellulose products 1 from the cellulose blank structure 2 in a pressing operation $O_P$. The cellulose blank structure 2 is air-formed in the blank dry-forming module 4 onto a forming wire 4*c*, and fed to the one or more forming molds 3 of the pressing module 6. The forming of the cellulose products 1 is thus accomplished in the pressing module 6. The cellulose products 1 are suitably non-flat. With non-flat products is meant products that have an extension in three dimensions, which is different from flat products like blanks or sheets.

With an air-formed cellulose blank structure 2 is meant an essentially air-formed fibrous web structure produced from cellulose fibers. The cellulose fibers may originate from a suitable cellulose raw material R, such as a pulp material. Suitable pulp materials are for example fluff pulp, paper structures, or other cellulose fiber containing structures. With air-forming of the cellulose blank structure 2 is meant the formation of a cellulose blank structure in a dry-forming process in which the cellulose fibers are air-formed to produce the cellulose blank structure 2. When air-forming the cellulose blank structure 2 in the air-forming process, the cellulose fibers are carried and formed to the fiber blank structure 2 by air as carrying medium. This is different from a normal papermaking process or a traditional wet-forming process, where water is used as carrying medium for the cellulose fibers when forming the paper or fiber structure. In the air-forming process, small amounts of water or other substances may if desired be added to the cellulose fibers in order to change the properties of the cellulose product, but air is still used as carrying medium in the forming process. The cellulose blank structure 2 may, if suitable have a dryness that is mainly corresponding to the ambient humidity in the atmosphere surrounding the air-formed cellulose blank structure 2. As an alternative, the dryness of the cellulose blank structure 2 can be controlled in order to have a suitable dryness level when forming the cellulose products 1.

Figure 2:
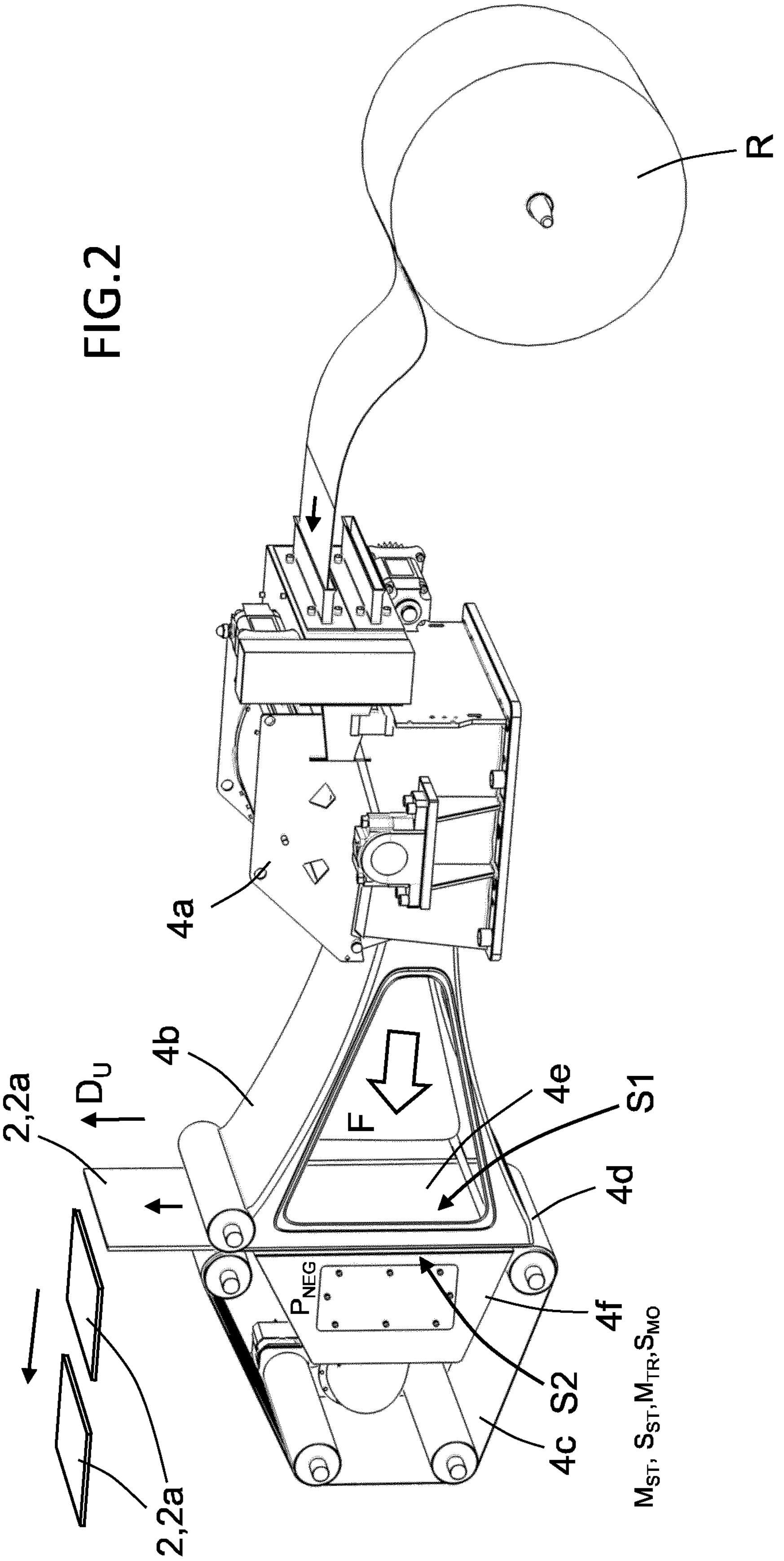
FIG. 2 shows schematically, in a perspective view, a blank dry-forming module according to the disclosure.

The air-formed cellulose blank structure 2 is formed of cellulose fibers in the blank dry-forming module 4 as illustrated in FIGS. 1 and 2, and may be configured in different ways. For example, the cellulose blank structure 2 may have a composition where the fibers are of the same origin or alternatively contain a mix of two or more types of cellulose fibers, depending on the desired properties of the cellulose products 1. The cellulose fibers used in the cellulose blank structure 2 are during the forming process of the cellulose products 1 strongly bonded to each other with hydrogen bonds. The cellulose fibers may be mixed with other substances or compounds to a certain amount as will be further described below. With cellulose fibers is meant any type of cellulose fibers, such as natural cellulose fibers or manufactured cellulose fibers. The cellulose blank structure 2 may specifically comprise at least 95% cellulose fibers, or more specifically at least 99% cellulose fibers. However, the cellulose blank structure 2 may have other suitable configurations and cellulose fiber amounts.

The air-formed cellulose blank structure 2 may have a single-layer or a multi-layer configuration. A cellulose blank structure 2 having a single-layer configuration is referring to a structure that is formed of one layer containing cellulose fibers. A cellulose blank structure 2 having a multi-layer configuration is referring to a structure that is formed of two or more layers comprising cellulose fibers, where the layers may have the same or different compositions or configurations.

One or more reinforcement layers comprising cellulose fibers may be added to the cellulose blank structure 2. The one or more reinforcement layers may be arranged as carrying layers for the cellulose blank structure 2. The reinforcement layer may have a higher tensile strength than the cellulose blank structure 2. This is useful when one or more air-formed layers of the cellulose blank structure 2 have compositions with low tensile strength in order to avoid that the cellulose blank structure 2 will break during the forming of the cellulose products 1. The reinforcement layer with a higher tensile strength acts in this way as a supporting structure for the cellulose blank structure 2. The reinforcement layer may be of a different composition than the cellulose blank structure 2, such as for example a tissue layer containing cellulose fibers, an air laid structure comprising cellulose fibers, or other suitable layer structures. It is thus not necessary that the reinforcement layer is air-formed.

The cellulose blank structure 2 may further comprise or be arranged in connection to one or more barrier layers giving the cellulose products the ability to hold or withstand liquids, such as for example when the cellulose products 1 are used in contact with beverages, food, and other water-containing substances. The one or more barrier layers may be of a different composition than the rest of the cellulose blank structure 2, such as for example a tissue barrier structure.

The one or more air-formed layers of the cellulose blank structure 2 are fluffy and airy structures, where the cellulose fibers forming the structures are arranged relatively loosely in relation to each other. The fluffy cellulose blank structures 2 are used for an efficient forming of the cellulose products 1, allowing the cellulose fibers to form the cellulose products 1 in an efficient way during the forming process.

The pressing module 6 comprises one or more forming molds 3, as indicated in FIGS. 1, 3*a-e* and 6, and each forming mold 3 comprises a first mold part 3*a* and a second mold part 3*b*. Corresponding first and second mold parts are cooperating with each other in the pressing operation $O_P$ during the forming of the cellulose products 1 in the pressing module 6. Each first mold part 3*a* and corresponding second mold part 3*b* are movably arranged relative to each other, and the first mold part 3*a* and the second mold part 3*b* are configured for moving relative to each other in a pressing direction $D_P$.

In the embodiment illustrated in FIGS. 1, 3*a-e* and 6, the second mold parts 3*b* are stationary and the first mold parts 3*a* are movably arranged in relation to the second mold parts 3*b* in the pressing direction $D_P$, during the pressing operation $O_P$. As indicated with the double arrow in FIGS. 3*a-b*, the first mold parts 3*a* are configured to move both towards the second mold parts 3*b* and away from the second mold parts 3*b* in linear movements along an axis extending in the pressing direction $D_P$.

In alternative embodiments, during the pressing operation $O_P$, the first mold parts 3*a* may be stationary with the second mold parts 3*b* movably arranged in relation to the first mold parts 3*a*, or both the first mold parts 3*a* and the second mold parts 3*b* may be movably arranged in relation to each other.

Figure 6:
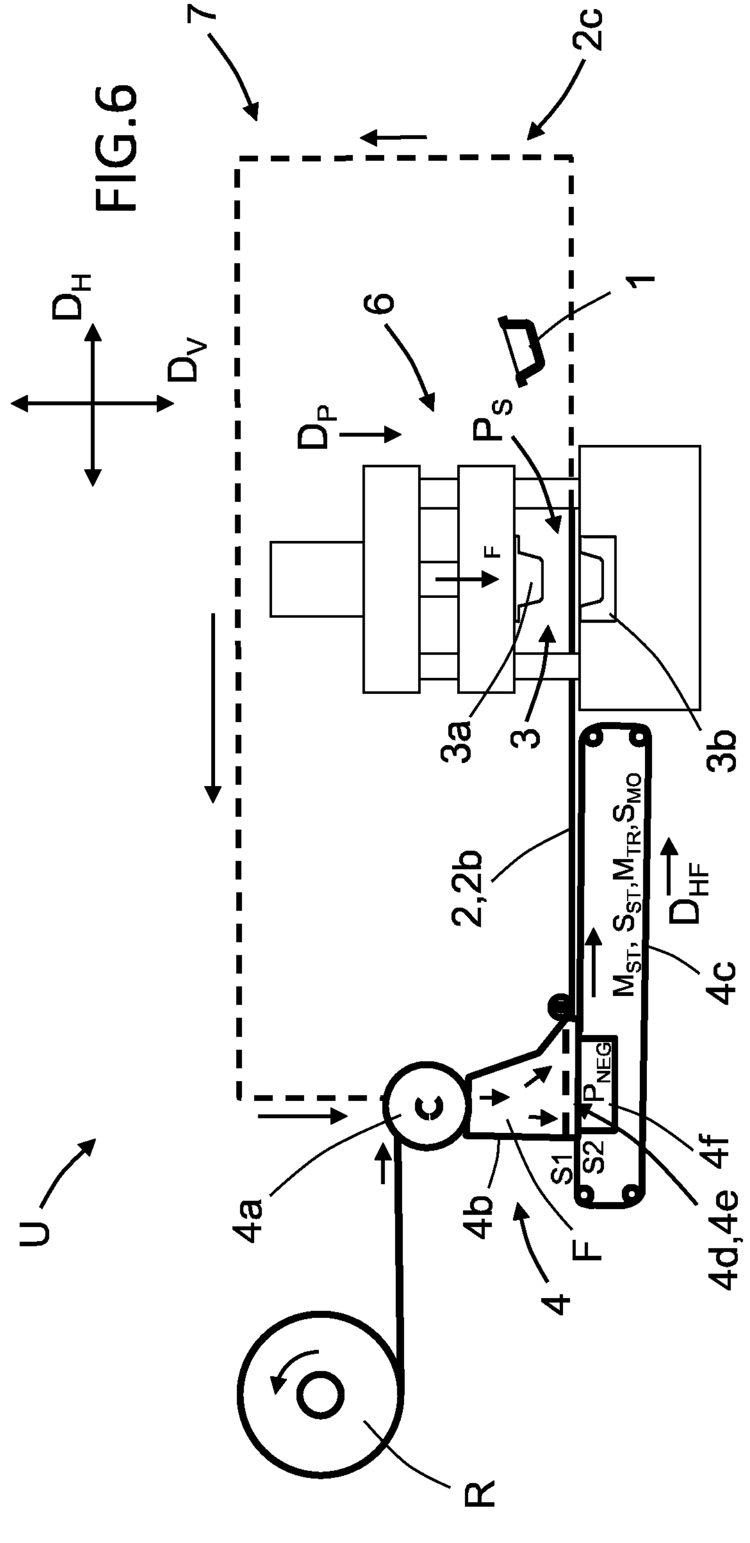
FIG. 6 shows schematically, in a side view, a product forming unit of an alternative embodiment according to the disclosure.

The pressing module 6 may be of a single-cavity configuration or alternatively of a multi-cavity configuration. A single-cavity pressing module comprises only one forming mold 3 with first and second mold parts, as shown in FIG. 6. A multi-cavity pressing module comprises two or more forming molds 3, each having cooperating first and second mold parts. In the embodiment illustrated in FIGS. 1 and 3*a*, the pressing module 6 is arranged as a multi-cavity pressing module comprising a plurality of forming molds 3 with first and second mold parts, where the movements of the mold parts suitably are synchronized for a simultaneous forming operation. The part of the pressing module 6 shown in FIGS. 3*b-e* is illustrating the single-cavity configuration, or alternatively a section of the multi-cavity configuration with one forming mold 3. In the following, the pressing module 6 will be described in connection to a multi-cavity pressing module, but the disclosure is equally applicable on a single-cavity pressing module.

It should be understood that for all embodiments according to the disclosure, the expression moving in the pressing direction $D_P$ includes a movement in the pressing direction $D_P$, and the movement may take place in opposite directions. The expression may further include both linear and non-linear movements of a mold part, where the result of the movement during forming is a repositioning of the mold part in the pressing direction $D_P$.

With the expression pressing operation $O_P$ is meant the operation of the mold parts for forming a cellulose product from the cellulose blank structure. The pressing operation $O_P$ starts when the one or more first mold parts 3*a* and/or the one or more second mold part are moved from a stationary position $P_S$. In this position, the one or more first mold parts 3*a* and the one or more second mold parts 3*b* are arranged at a distance from each other and the cellulose blank structure 2 can be fed into the forming mold 3 in a forming position between the one or more first mold parts 3*a* and the one or more second mold parts 3*b*. Thereafter, the one or more first mold parts 3*a* and/or the one or more second mold parts 3*b* are moved towards each other for applying a forming pressure onto the cellulose blank structure 2 and then moved away from each other back to the stationary position $P_S$. When the mold parts have reached the stationary position $P_S$ again, the pressing operation $O_P$ is completed. The pressing operation $O_P$ is thus defined as a pressing cycle during which the cellulose blank structure is exerted to a forming pressure, and the duration of the pressing operation $O_P$ is calculated from the start of the movements of the one or more first mold parts 3*a* and/or the one or more second mold parts 3*b* from the stationary position $P_S$ until they have reached the stationary position $P_S$ again.

It should be understood that a forming pressure may be applied to the cellulose blank structure 2 in only one pressing step during the pressing operation $O_P$. Alternatively, a forming pressure may be applied in two or more repeated pressing steps during the pressing operation $O_P$, and in this way the mold parts are repeatedly exerting a forming pressure onto the cellulose blank structure.

Suitably, the pressing operation $O_P$ is a single pressing operation $O_{SP}$, in which a forming pressure is applied to the cellulose blank structure 2 in only one pressing step during the pressing operation $O_P$. With the single pressing operation $O_{SP}$ is thus meant that the cellulose product 1 is formed from the cellulose blank structure 2 in one single pressing step in the pressing module 6. In the single pressing operation $O_{SP}$, the one or more first mold parts 3*a* and the one or more second mold parts 3*b* are interacting with each other for establishing a forming pressure and the forming temperature during a single operational engagement step. In the single pressing operation, a forming pressure and a forming temperature are not applied to the cellulose blank structure 2 in two or more repeated or subsequent pressing steps.

To form the cellulose products 1 from the air-formed cellulose blank structure 2 in the product forming unit U, the cellulose blank structure 2 is air-formed from cellulose fibers in the blank dry-forming module 4 of the product forming unit U and directly fed to the pressing module 6.

The cellulose products 1 are formed from the cellulose blank structure 2 in the one or more forming molds 3 by heating the cellulose blank structure 2 to a forming temperature $T_F$, and pressing the cellulose blank structure 2 with a forming pressure $P_F$ in the pressing operation $O_P$. The forming temperature $T_F$ is in the range of 100-300° C., preferably in the range of 100-200° C., and the forming pressure $P_F$ is in the range of 1-100 MPa, preferably in the range of 4-20 MPa. The first mold parts 3*a* are arranged for forming the cellulose products 1 through interaction with the corresponding second mold parts 3*b*, as exemplified in FIGS. 3*b-e*. During forming of the cellulose products 1, the cellulose blank structure 2 is in each forming mold 3 exerted to the forming pressure $P_F$ in the range of 1-100 MPa, preferably in the range of 4-20 MPa, and the forming temperature $T_F$ in the range of 100-300° C., preferably in the range of 100-200° C. The cellulose products 1 are thus formed from the cellulose blank structure 2 between each of the first mold parts 3*a* and corresponding second mold parts 3*b* by heating the cellulose blank structure 2 to the forming temperature $T_F$ in the range of 100-300° C., preferably in the range of 100-200° C., and by pressing the cellulose blank structure 2 with the forming pressure $P_F$ in the range of 1-100 MPa, preferably in the range of 4-20 MPa. When forming the cellulose products 1, strong hydrogen bonds are formed between the cellulose fibers in the cellulose blank structure 2 arranged between the first mold parts 3*a* and the second mold parts 3*b*. The temperature and pressure levels are for example measured in the cellulose blank structure 2 during the forming process with suitable sensors arranged in or in connection to the cellulose fibers in the cellulose blank structure 2.

The pressing module 6 may further comprises a heating unit. The heating unit is configured for applying the forming temperature $T_F$ onto the cellulose blank structure 2 in each forming mold 3. The heating unit may have any suitable configuration. The heating unit may be integrated in or cast into the first mold parts 3*a* and/or the second mold parts 3*b*, and suitable heating devices are e.g. electrical heaters, such as a resistor element, or fluid heaters. Other suitable heat sources may also be used.

Figure 3A:
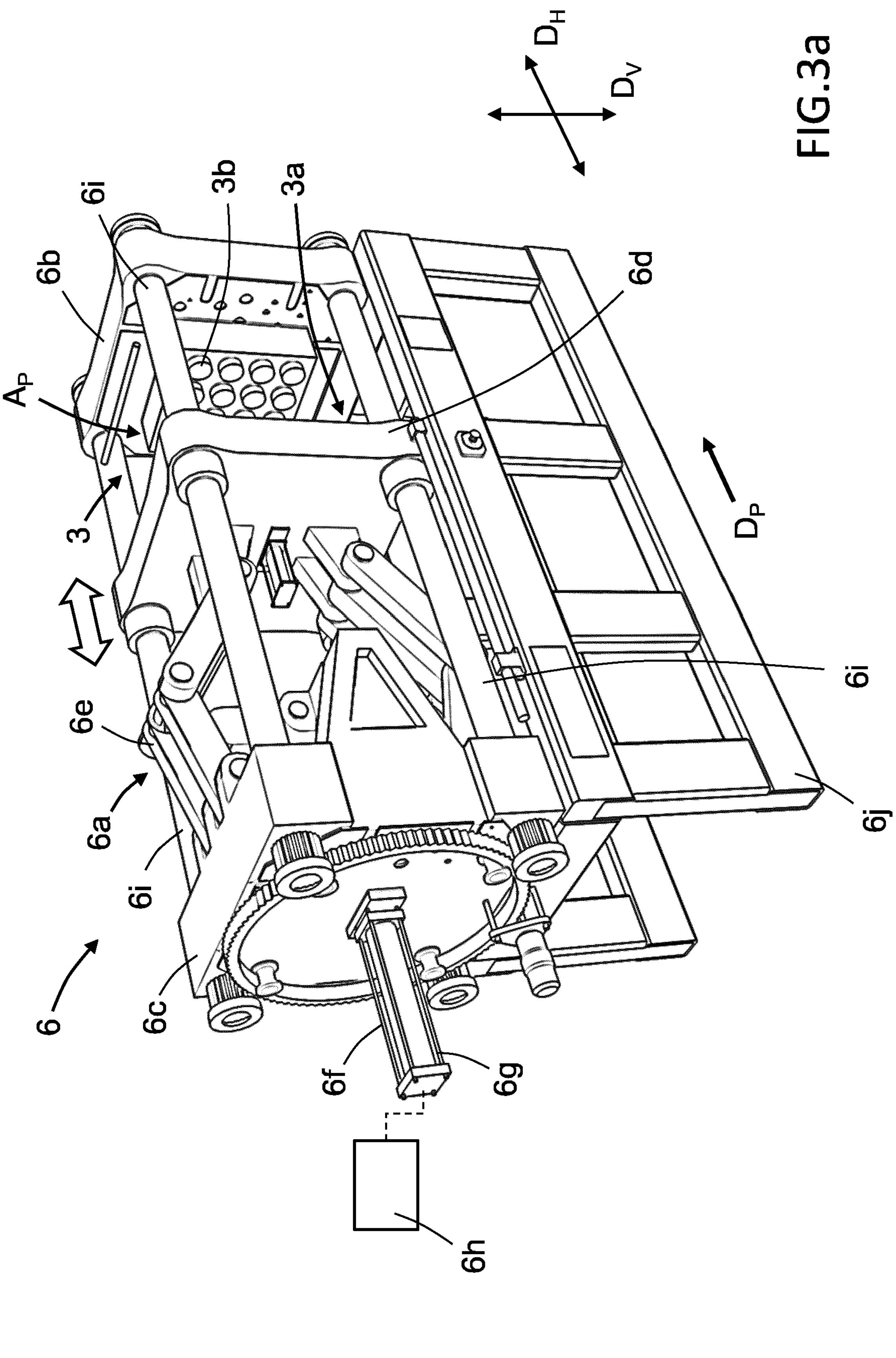
FIG. 3*a-e* show schematically, in a perspective view and in side views, a pressing module according to the disclosure.
Figure 3B:
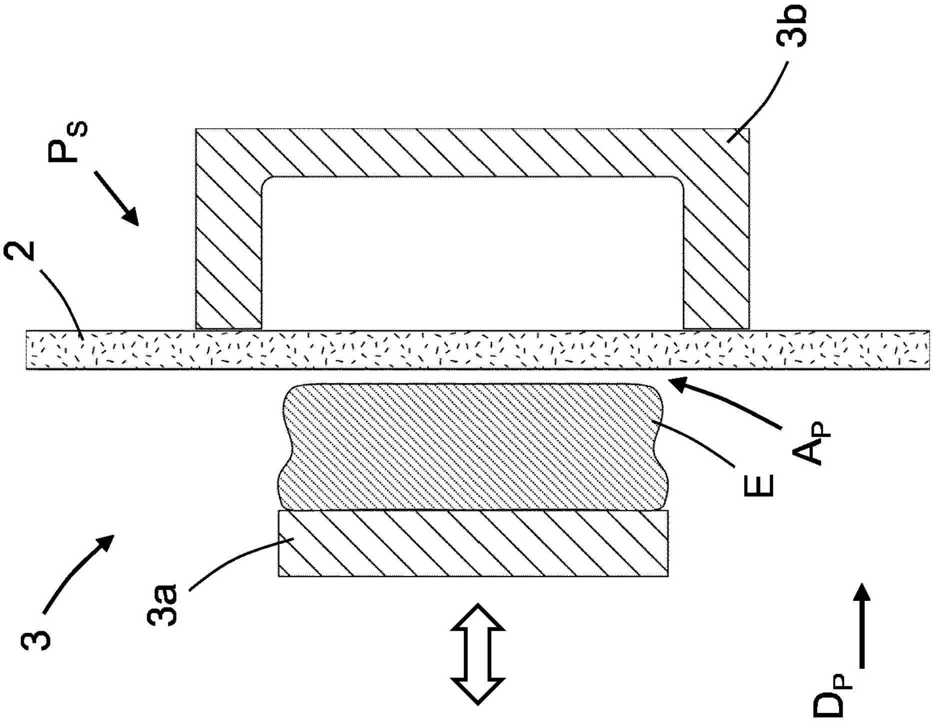
Figure 3C:
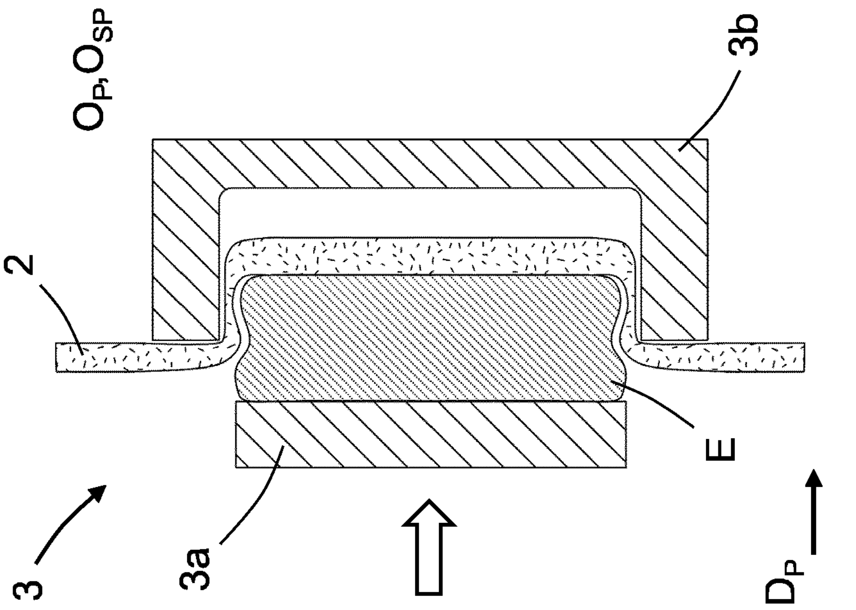
Figure 3E:
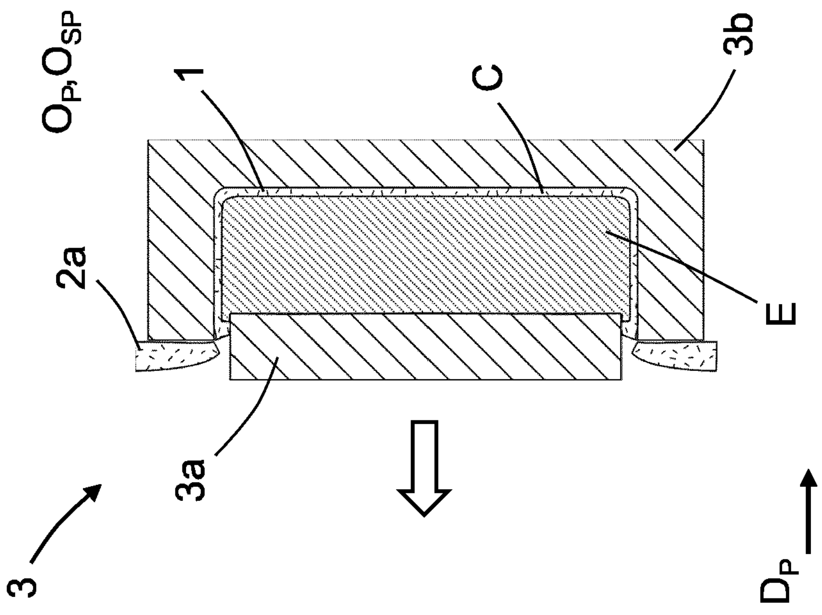
Figure 3D:
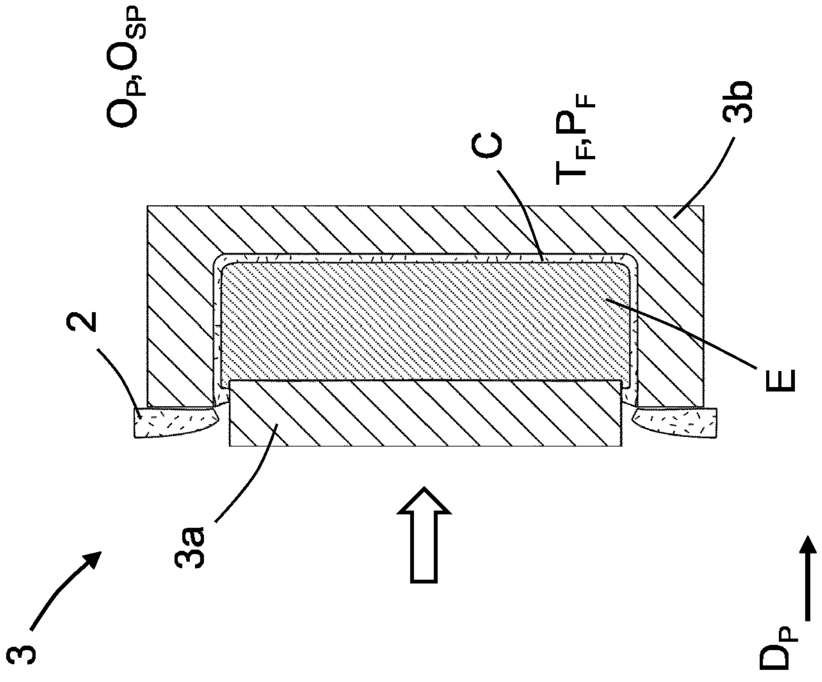

In FIG. 3*b*, the first mold parts 3*a* and the second mold parts 3*b* are arranged in the stationary position $P_S$, from which the first mold parts 3*a* can be moved to start the pressing operation $O_P$. When the cellulose blank structure 2 is arranged in the forming position between the first mold parts 3*a* and the second mold parts 3*b*, as shown in FIG. 3*b*, the first mold parts 3*a* are moved towards the second mold parts 3*b* in the pressing direction $D_P$, as illustrated with the arrow in FIG. 3*c*. Upon movement of the first mold parts 3*a* towards the second mold parts 3*b*, the cellulose blank structure 2 is being increasingly compacted between the mold parts, until the first mold parts 3*a* have been further moved towards the second mold parts 3*b* and reached a product forming position, as shown in FIG. 3*d*, in which the forming pressure $P_F$ and forming temperature $T_F$ is exerted onto the cellulose blank structure 2. A forming cavity C for forming the cellulose products 1 is formed between each first mold part 3*a* and second mold part 3*b* during forming of the cellulose products 1 when each first mold part 3*a* is pressed towards its corresponding second mold part 3*b* with the cellulose blank structure 2 arranged between the mold parts. The forming pressure $P_F$ and the forming temperature $T_F$ are applied to the cellulose blank structure 2 in each forming cavity C. The forming of the cellulose products 1 may further include an edge-forming operation and a cutting or separation operation in the pressing module 6, where edges are formed on the cellulose products 1 and where the cellulose products 1 are separated from the cellulose blank structure 2 during forming of the cellulose products 1. The mold parts may for example be arranged with edge-forming devices and cutting or separation devices for such operations, or alternatively the edges may be formed in the product cutting or separation operation. Once the cellulose products 1 have been formed in the pressing module 6, the first mold parts 3*a* are moved in a direction away from the second mold parts 3*b*, as shown in FIG. 3*e*, and the cellulose products 1 can be removed from the pressing module 6, for example by using ejector rods or similar devices. When the first mold parts 3*a* have returned to the stationary position $P_S$, as shown in FIG. 3*b*, the pressing operation is completed.

A pressure distribution element E for establishing the forming pressure may be arranged in connection to each first mold part 3*a* and/or second mold part 3*b*. In the embodiment illustrated in FIGS. 3*b-e*, the pressure distribution element E is attached to the first mold part 3*a*. The pressure distribution element E is deformed when exerted to pressure, and by arranging the pressure distribution element E in connection to a mold part, the forming pressure $P_F$ may be configured as an equalized forming pressure where the pressure in the forming mold 3 is efficiently distributed in different directions. The pressure distribution element E is enabling a forming pressure distribution in the forming mold 3 not only in the pressing direction $D_P$, but also in directions different from the pressing direction $D_P$, such as directions between the pressing direction $D_P$ and directions perpendicular to the pressing direction $D_P$. The equalized forming pressure may include an isostatic forming pressure.

The first mold parts 3*a* and/or the second mold parts 3*b* may comprise pressure distribution elements E and the pressure distribution elements E are configured for exerting the forming pressure $P_F$ on the cellulose blank structure 2 in the forming cavities C during forming of the cellulose products 1. The pressure distribution elements E may be attached to the first mold parts 3*a* and/or the second mold parts 3*b* with suitable attachment means, such as for example glue or mechanical fastening members. During the forming of the cellulose products 1, the pressure distribution elements E are deformed to exert the forming pressure $P_F$ on the cellulose blank structure 2 in the forming cavities C and through deformation of the pressure distribution elements E, an equalized pressure distribution is achieved even if the cellulose products 1 are having complex three-dimensional shapes or if the cellulose blank structure 2 is having a varied thickness. To exert a required forming pressure $P_F$ on the cellulose blank structure 2, the pressure distribution elements E are made of a material that can be deformed when a force or pressure is applied, and the pressure distribution elements E are suitably made of an elastic material capable of recovering size and shape after deformation. The pressure distribution elements E may further be made of a material with suitable properties that is withstanding the high forming pressure $P_F$ and forming temperature $T_F$ levels used when forming the cellulose products 1.

Certain elastic or deformable materials have fluid-like properties when being exposed to high pressure levels. If the pressure distribution elements E are made of such a material or combinations of such materials, an equalized pressure distribution can be achieved in the forming process. Each pressure distribution element E may be made of a suitable structure of elastomeric material or materials, and as an example, the pressure distribution element E may be made of a structure of gel materials, silicone rubber, polyurethane, polychloroprene, rubber, or a combination of different suitable materials.

As described above, the product forming unit U further comprises the blank dry-forming module 4 configured for air-forming the cellulose blank structure 2 from the cellulose raw material R, as illustrated in FIGS. 1, 2 and 6. The cellulose raw material R is provided from a suitable source and the cellulose raw material R is fed to the blank dry-forming module 4. The cellulose blank structure 2 is dry-formed from the cellulose raw material R in the blank dry-forming module 4 onto the forming wire 4*c*, and thereafter the air-formed cellulose blank structure 2 is transported from the blank dry-forming module 4 to the pressing module 6. The cellulose blank structure 2 may be air-formed in the dry-forming module 4 into discrete cellulose blanks 2*a*, as shown in FIG. 2. The discrete cellulose blanks 2*a* are formed as discrete pieces of material that are separated from each other and may for example be shaped into suitable configurations to avoid residual material after forming, which is minimizing the amount of cellulose material used. Alternatively, the cellulose blank structure 2 may be air-formed in the dry-forming module 4 into a continuous cellulose blank 2*b*, as shown in FIGS. 2 and 6. Depending on the air-forming process, the basis weight of the air-formed cellulose blank structure 2 may be uniform or varying.

As shown in FIGS. 1 and 2, the blank dry-forming module 4 comprises a mill 4*a*, a forming chamber 4*b*, and the forming wire 4*c* arranged in connection to the forming chamber 4*b*. Fibers F from the cellulose raw material R is separated from the cellulose raw material R in the mill 4*a* and the separated cellulose fibers F are distributed into the forming chamber 4*b* onto the forming wire 4*c* for air-forming the cellulose blank structure 2. The mill 4*a* is configured for separating cellulose fibers F from the cellulose raw material R, and the forming chamber 4*b* is configured for distributing the separated cellulose fibers F onto a forming section 4*d* of the forming wire 4*c* for air-forming the cellulose blank structure 2. The forming section 4*d* is arranged in connection to a forming chamber opening 4*e* of the forming chamber 4*b*. In the illustrated embodiment, the forming section 4*d* is extending in an upwards blank forming direction $D_U$. The cellulose blank structure 2 is air-formed onto the forming section 4*d*, and transported from the forming section 4*d* by the forming wire 4*c* in the upwards blank forming direction $D_U$. The upwards blank forming direction $D_U$ is used for a compact configuration and layout of the product forming unit U, allowing an efficient positioning of the different modules of the product forming unit U in relation to each other. After forming of the cellulose blank structure 2 onto the forming section 4*d*, the formed cellulose blank structure 2 is transported from the forming section 4*d* in the upwards blank forming direction $D_U$ and further towards the pressing module 6.

The mill 4*a* is separating the cellulose fibers F from the cellulose raw material R and is distributing the separated cellulose fibers F into the forming chamber 4*b*. The cellulose raw material R used may for example be bales, sheets, or rolls of fluff pulp, paper structures, or other suitable cellulose fiber containing structures, that are fed into the mill 4*a*. The mill 4*a* may be of any conventional type, such as for example a hammer mill, a disc mill, a saw-tooth mill, or other type of pulp de-fiberizing machine. The cellulose raw material R is fed into the mill 4*a* through an inlet opening, and the separated cellulose fibers F are distributed to the forming chamber 4*b* through an outlet opening of the mill 4*a* arranged in connection to the forming chamber 4*b*.

The forming chamber 4*b* is arranged for distributing the separated cellulose fibers onto the forming wire 4*c* for air-forming the cellulose blank structure 2. The forming chamber 4*b* is arranged as a hood structure or compartment in connection to the forming wire 4*c*. The forming chamber 4*b* is enclosing a volume in which the separated cellulose fibers F are distributed from the mill 4*a* to the forming wire 4*c*. The cellulose fibers F are distributed by a flow of air generated by the mill 4*a*, and the flow of air is transporting the fibers in the forming chamber 4*b* from the mill 4*a* to the forming wire 4*c*.

The forming wire 4*c* may be of any suitable conventional type, and may be formed as an endless belt structure, as understood from FIGS. 1, 2 and 6. A vacuum box 4*f* may be arranged in connection to the forming wire 4*c* and the forming chamber 4*b* for controlling the flow of air in the forming chamber 4*b*, and for distributing the separated cellulose fibers F onto the forming wire 4*c*. The forming wire 4*c* has a first side S1 facing the forming chamber 4*b* and a second side S2 facing the vacuum box 4*f*. The cellulose blank structure 2 is in this way air-formed onto the first side S1 of the forming wire 4*c* upon application of a negative pressure $P_{NEG}$ onto the second side S2 for securing attachment of the cellulose fibers F onto the first side S1.

The blank dry-forming module 4 of the embodiment illustrated in FIGS. 1 and 2 has a horizontal distribution direction of the cellulose fibers F from the mill 4*a* to the forming wire 4*c* through the forming chamber 4*b*. A horizontal flow of air is thus feeding the cellulose fibers F from the mill 4*a* to the forming section 4*d*, which is different from traditional dry-forming systems with a vertical flow of air. The length of the fiber carrying distance by the flow of air inside the forming chamber 4*b* needs to be long enough to minimize turbulence and/or create a uniform flow of cellulose fibers F. Thus, the length of the blank forming module 4 is therefore dependent of the fiber carrying distance by the flow of air. The upwards blank forming direction $D_U$ is enabling the compact configuration and layout of the product forming unit U, and is reducing the length of the product forming unit U compared to traditional solutions. Further, access for maintenance of the mill 4*a* from a plant floor level is enabled without additional elevated flooring structures or platforms, due to the positioning of the blank dry-forming unit 4 at the plant floor level. This positioning and the horizontal flow of air also enables low height of the product forming unit U compared to traditional solutions using vertical air flow.

The blank dry-forming module 4 is as illustrated in for example FIGS. 1 and 6 arranged upstream the pressing module 6, and the blank dry-forming module 4 has the purpose to air-form the cellulose blank structure 2 from cellulose fibers F originating from the cellulose raw material R. $D_{Ue}$ to the intermittent operation of the pressing module 6, the cellulose blank structure 2 needs to be intermittently transported to the pressing module 6.

The intermittent transporting of the cellulose blank structure 2 to the pressing module 6 is arranged with a suitable feeding device, such as for example a conveyor belt or feeding rollers that are intermittently controlled to feed the cellulose blank structure 2 to the pressing module 6. When the pressing module 6 is operated to apply the forming pressure $P_F$ onto the cellulose blank structure 2, the cellulose blank structure 2 is in in a non-moving state. In other words, the feeding of the cellulose blank structure 2 to the forming position between the one or more first mold parts 3*a* and the one or more second mold parts 3*b* is taking place when the mold parts are in at least a partly open state. The at least partly open state is allowing the cellulose blank structure 2 to be securely positioned between the one or more first mold parts 3*a* and the one or more second mold parts 3*b* without any disturbing interaction from the mold parts. Since the forming unit U is arranged without any buffering modules or similar arrangements, the intermittent transportation of the cellulose blank structure to the pressing module needs to be synchronized with the air-forming of the cellulose blank structure 2 in the blank dry-forming module 4. This synchronization is according to the present disclosure achieved through arranging the forming wire 4*c* in a stationary mode $M_{ST}$ during the pressing operation $O_P$. In the stationary mode $M_{ST}$, the forming wire 4*c* is arranged in a standstill state $S_{ST}$. The duration of the standstill state $S_{ST}$ is synchronized with the duration of the pressing operation $O_P$, such that the standstill state $S_{ST}$ is occurring during the pressing operation $O_P$. The forming wire 4*c* may be arranged in the standstill state $S_{ST}$ at any time during the pressing operation $O_P$, and the time duration of the standstill state $S_{ST}$ may be only a part of the time duration of the pressing operation $O_P$, or alternatively the full pressing operation $O_P$.

The stationary mode $M_{ST}$ of the forming wire 4c is followed by a transporting mode $M_{TR}$. In the transporting mode $M_{TR}$, the forming wire 4c is arranged in a moving state $S_{MO}$, and the air-formed cellulose blank structure 2 is moved away from the blank dry-forming module 4 by the forming wire 4c in the moving state $S_{MO}$. The moving state $S_{MO}$ is at least partly occurring between two subsequent pressing operations $O_P$, when the one or more first mold parts 3a and/or the one or more second mold part are in the stationary position $P_S$. The moving state $S_{MO}$ is synchronized with the feeding of the air-formed cellulose blank structure 2 to the pressing module for an efficient intermittent transporting operation of the cellulose blank structure 2 from the blank dry-forming module 4 to the pressing module 6. The cellulose blank structure 6 is suitably transferred from the forming wire 4c to the feeding device further transporting the cellulose blank structure 2 to the pressing module 6.

The different modes and states of the forming wire 4c are suitably controlled with a control unit for an efficient operation of the product forming unit U.

The mill 4a may be operated in different ways depending on the configuration of the cellulose blank structure 2 that is being air-formed in the blank dry-forming module 4. The mill 4a is suitably continuously operated. In one embodiment, the cellulose raw material R is continuously fed to the mill 4a. In alternative embodiments, the cellulose raw material R is instead intermittently fed to the mill 4a.

In the embodiment shown in FIG. 1, the cellulose blank structure 2 is intermittently transported from the blank dry-forming module 4 by the forming wire 4c in a first feeding direction $D_{F1}$, and thereafter intermittently transported to the pressing module 6 in a second feeding direction $D_{F2}$, where the second feeding direction $D_{F2}$ differs from the first feeding direction $D_{F1}$. The differing first feeding direction $D_{F1}$ and second feeding direction $D_{F2}$ are allowing a compact configuration and layout of the product forming unit U, and an efficient and compact positioning of the different modules of the product forming unit U in relation to each other.

In certain embodiments, the first feeding direction $D_{F1}$ is opposite to, or essentially opposite to, the second feeding direction $D_{F2}$. In the embodiment illustrated in FIG. 1, the first feeding direction $D_{F1}$ is an upwards direction and the second feeding direction $D_{F2}$ is a downwards direction, which is allowing a compact and efficient configuration of the product forming unit U.

In an alternative embodiment shown in FIG. 6, the forming section 4d of the forming wire 4c is extending in a horizontal blank forming direction $D_{HF}$. The cellulose blank structure 2 is in this embodiment air-formed onto the forming section 4d, and transported from the forming section 4d by the forming wire 4c in the horizontal blank forming direction $D_{HF}$. The horizontal blank forming direction $D_{HF}$ is used for a traditional configuration and layout of the product forming unit U, allowing an efficient positioning of the different modules of the product forming unit U in relation to each other. After forming of the cellulose blank structure 2 onto the forming section 4d, the formed cellulose blank structure 2 is transported from the forming section 4d in the horizontal blank forming direction $D_{HF}$ and further towards the pressing module 6.

The blank dry-forming module 4 of the embodiment illustrated in FIG. 6 has a vertical distribution direction of the cellulose fibers F from the mill 4a to the forming wire 4c through the forming chamber 4b. A vertical flow of air is thus feeding the cellulose fibers F from the mill 4a to the forming section 4d.

The pressing module 6 may have any suitable configuration, such as for example a hydraulic pressing module or a toggle pressing module.

One embodiment of a pressing module 6 is illustrated in FIG. 3a. In the illustrated embodiment, the pressing module 6 is a cellulose product toggle pressing module for forming the cellulose products 1 from the cellulose blank structure 2. The cellulose product toggle pressing module comprises the one or more forming molds 3, as indicated in FIGS. 1 and 3a-e, and each forming mold 3 comprises the first mold part 3a and a second mold part 3b.

The pressing module 6 comprises a toggle press 6a and the one or more forming molds 3. The toggle press 6a includes a front structure 6b, a rear structure 6c, and a pressing member 6d movably arranged in the pressing direction $D_P$. A toggle-mechanism 6e is drivingly connected to the pressing member 6d. A pressing actuator arrangement 6f is drivingly connected to the toggle-mechanism 6e, and an electronic control system 6h is operatively connected to the pressing actuator arrangement 6f, and the one or more forming molds 3. The one or more forming molds 3 include the movable first mold parts 3a attached to the pressing member 6d and the stationary second mold parts 3b. The electronic control system 6h is configured for controlling operation of the pressing actuator arrangement 6f for driving the pressing member 6d using the toggle-mechanism 6e in the pressing direction $D_P$ and forming the cellulose product 1 from the cellulose blank structure 2 by pressing the first mold parts 3a against the stationary second mold parts 3b, as described above. The toggle press 6a is installed with, or arranged for being installed with, the pressing direction $D_P$ of the pressing member 6d arranged primarily in the horizontal direction $D_H$, specifically with the pressing direction $D_P$ of the pressing member 6d arranged within 20 degrees from the horizontal direction $D_H$, and more specifically with the pressing direction $D_P$ in parallel with the horizontal direction $D_H$.

The pressing member 6d is arranged between the front structure 6b and the rear structure 6c. The toggle-mechanism 6e is connected to the rear structure 6c and to the pressing member 6d. The pressing actuator arrangement 6f is connected to the toggle-mechanism 6e, and the pressing actuator arrangement 6f is configured for driving the pressing member 6d in the pressing direction $D_P$ towards the front structure 6b by using the toggle-mechanism 6e. The pressing actuator arrangement 6f is further configured for driving the pressing member 6d away from the front structure 6b by using the toggle-mechanism 6e when the cellulose products 1 have been formed in the one or more forming molds 3. The toggle press 6a further includes a pressing force indicating arrangement 6g, and an electronic control system 6h operatively connected to the pressing actuator arrangement 6f and the pressing force indicating arrangement 6g. The electronic control system 6h is configured for controlling an operation of the pressing member 6d. The one or more forming molds 3, each comprises a first mold part 3a attached to the pressing member 6d and a second mold part 3b attached to the front structure 6b. The first and second mold parts 3a,3b are configured to jointly form the cellulose products 1 from the cellulose blank structure 2 when being pressed together.

When forming the cellulose products 1, the cellulose blank structure 2 is fed into a pressing area $A_P$ defined by the first mold parts 3a and the second mold parts when being spaced apart, as exemplified in FIG. 3b. The operation of the pressing actuator arrangement 6f is controlled by means of the electronic control system 6h for driving the pressing member 6d in the pressing direction $D_P$ towards the front structure 6_b_ by using the toggle-mechanism 6_e_. In this way, each of the first mold parts 3_a_ and second mold parts 3_b_ jointly form the cellulose product 1 from the cellulose blank structure 2 when being pressed together.

The pressing actuator arrangement 6_f_ may for example include a single or a plurality of hydraulic or pneumatic linear actuators, such as cylinder-piston actuators. Alternatively, a motor with a rotating output shaft, such as an electric, hydraulic or pneumatic motor may be used for driving a mechanical actuator, or the pressing actuator arrangement 6_f_ may include a high-torque electric motor that is drivingly connected to the toggle-mechanism 6_e_ via a rotary-to-linear transmission device.

The movable first mold part 3_a_ may be attached directly or indirectly to the pressing member 6_d_. This means that there may for example be an intermediate member arranged between movable first mold part 3_a_ and the pressing member 6_d_, for example a load cell for detecting pressing force, or the like. The stationary second mold part 3_b_ is typically stationary during the pressing action but may nevertheless be adjustable in the pressing direction $D_P$ in the time period between consecutive pressing actions. In the illustrated embodiment, the toggle press 6_a_ includes the front structure 6_b_ and the rear structure 6_c_, where the toggle-mechanism 6_e_ is connected also to the rear structure 6_c_, and the stationary second mold part 3_b_ is attached to the front structure 6_b_. The stationary second mold part 3_b_ may be attached directly or indirectly to the front structure 6_b_. This means that there may for example be an intermediate member arranged between stationary second mold part 3_b_ and the front structure 6_b_, for example a load cell for detecting pressing force, or the like.

The front structure 6_b_ and the rear structures 6_c_ represent two rigid and structurally relevant parts that must be interconnected by some kind of structurally rigid construction for ensuring that the front and rear structures do not separate from each other during pressing action. The front and rear structures may have many different forms, depending on the specific design of the pressing module 6. For example, the front and rear structures may have a plate-like shape, in particular rectangular plate-like shape, thereby enabling cost-effective manufacturing and the possibility of using the corner regions of the plate-shaped front and rear structures for attachment to a common rigid frame structure defined by the front structure 6_b_, the rear structure 6_c_, and an intermediate frame structure that connects the front structure 6_b_ with the rear structure 6_c_. In some example embodiments, the toggle press 6_a_ comprises a rigid frame structure defined by the front structure 6_b_, the rear structure 6_c_, and an intermediate linear guiding arrangement 6_i_ that connects the front structure 6_b_ with the rear structure 6_c_. The pressing member 6_d_ is movably attached to the linear guiding arrangement 6_i_ and movable in the pressing direction $D_P$. The rigid frame structure may be positioned on an underlying support frame 6_j_ for providing the desired height and angular inclination of the pressing module 6.

For enabling cost-effective and strong frame structure of the toggle press 6_a_, the intermediate linear guiding arrangement 6_i_ may comprises four tie bars, arranged in each corner region of the plate-shaped front structure 6_b_ and rear structure 6_c_. The tie bars are for example cylindrical and corresponding cylindrical holes may be provided in the corner regions of the plate-shaped front structure 6_b_ and rear structure 6_c_ for receiving said tie bars. The pressing member 6_d_ may have any structural shape. However, in some example embodiments, also the pressing member has at least partly a plate-like shape, in particular a rectangular plate-like shape, thereby enabling cost-effective manufacturing and the possibility of using the corner regions of the plate-shaped pressing member 6_d_ for attachment to the intermediate linear guiding arrangement 6_i_. Hence, the toggle press 6_a_ may in some example embodiments be referred to as a three platen press.

The toggle press 6_a_ is installed with, or arranged for being installed with, the pressing direction $D_P$ of the pressing member 6_d_ arranged primarily in the horizontal direction $D_H$, specifically with the pressing direction $D_P$ of the pressing member 6_d_ arranged within 20 degrees from the horizontal direction $D_H$, and more specifically with the pressing direction $D_P$ in parallel with the horizontal direction $D_H$.

In the embodiment illustrated in FIG. 3_a_, the toggle press 6_a_ is installed with the pressing direction $D_P$ of the pressing member 6_d_ arranged in the horizontal direction $D_H$. In the embodiments illustrated in FIGS. 4_a-b_, the toggle press 6_a_ is installed in a slightly inclined state enabling a compact overall design of the product forming unit U, with a low build-height. The toggle press 6_a_ in the embodiments shown in FIGS. 4_a-b_ is installed with the pressing direction $D_P$ of the pressing member 6_d_ arranged with an installation angle $\alpha$ in the range of 0-20 degrees, wherein said installation angle $\alpha$ is defined by the pressing direction $D_P$ and the horizontal direction $D_H$, as illustrated in the figures.

Figure 4A:
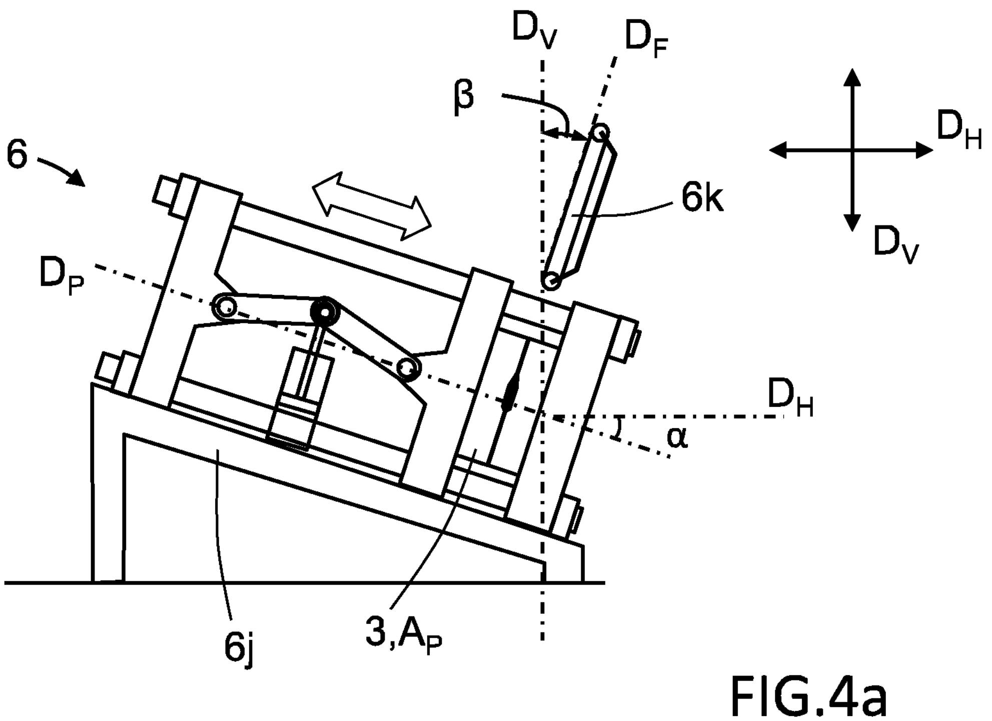
FIG. 4*a-b* show schematically, in side views, pressing modules according to alternative embodiments of the disclosure.
Figure 4B:
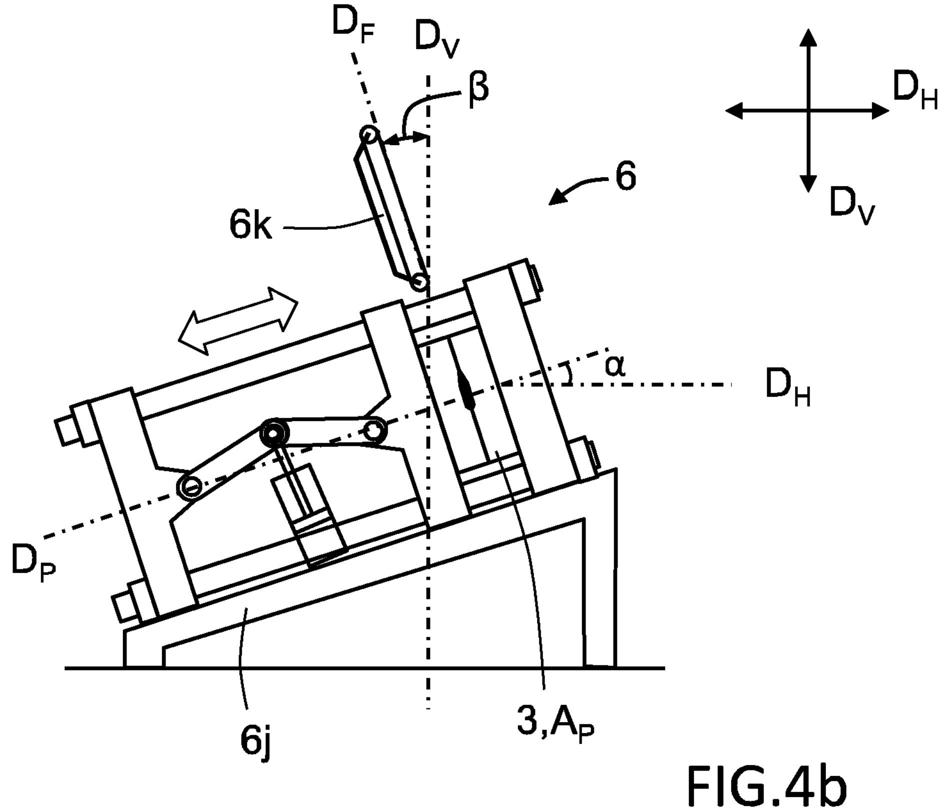

In some example embodiments, the toggle press 6_a_ further includes a feeding device 6_k_ for feeding the cellulose blank structure 2 into the one or more forming molds 3 in a primarily vertical feeding direction $D_F$. The feeding device 6_k_ is arranged for feeding the cellulose blank structure 2 into the pressing area $A_P$, specifically for feeding the cellulose blank structure 2 downwards with a feeding angle $\beta$ of less than 20 degrees from the vertical direction $D_V$ into the pressing area $A_P$, and more specifically for feeding the air-formed cellulose blank structure vertically downwards into the pressing area $A_P$. The feeding angle $\beta$ is schematically illustrated in FIGS. 4_a-b_.

As described above, the terms primarily horizontal and primarily horizontally means a direction that is arranged more horizontal than vertical. The terms primarily vertical and primarily vertically means a direction that is arranged more vertical than horizontal.

The toggle-mechanism 6_e_ of the toggle press 6_a_ may have a large variety of designs and implementations. The basic requirement of the toggle-mechanism 6_e_ is to generate a pressing force amplification, thereby enabling the use of a relatively low-cost and low-capacity pressing actuator arrangement 6_f_ in term of pressing force. The pressing force amplification is accomplished by a corresponding reduction of pressing speed of the pressing module. Hence, the toggle-mechanism 6_e_ amplifies and slows down a pressing force/speed compared with the force/speed of the pressing actuator arrangement 6_f_.

In general, and with reference to the example embodiment of FIG. 3_a_, the toggle-mechanism 6_e_ includes link members, and the pressing actuator arrangement 6_f_ is directly drivingly connected, or indirectly drivingly connected, to the link members, such that actuation of the pressing actuator arrangement 6_f_ results in motion of the pressing member 6_d_.

The use of a toggle pressing module for forming cellulose products from an air-formed cellulose blank structure has many advantages over use of large conventional linear hydraulic presses, such as low-cost, low-weight, fast cycle operation and compactness. By having the electronic control system 6_h_ configured for controlling operation of the pressing actuator arrangement 6_f_, based on pressing force indicating feedback received from the pressing force indicating arrangement 6*g*, the toggle pressing module becomes an advantageous replacement of conventional linear hydraulic presses.

The product forming unit U may further comprise a non-illustrated barrier application module arranged upstream the pressing module 6. The barrier application module is configured for applying a barrier composition onto the cellulose blank structure 2 before forming the cellulose products 1 in the one or more forming molds 3.

One preferred property of the cellulose products 1 is the ability to hold or withstand liquids, such as for example when the cellulose products are used in contact with beverages, food, and other water-containing substances. The barrier composition may be one or more additives used when producing the cellulose products, such as for example AKD or latex, or other suitable barrier compositions. Another suitable barrier composition is a combination of AKD and latex, where tests have shown that unique product properties may be achieved with a combination of AKD and latex added to the air-formed cellulose blank structure 2 when forming the cellulose products 1. When using the combination of AKD and latex, a high level of hydrophobicity can be achieved, resulting in cellulose products 1 with a high ability to withstand liquids, such as water, without negatively affecting the mechanical properties of the cellulose products 1.

The barrier application module may be arranged as a hood structure in connection to the cellulose blank structure 2, and the hood structure is comprising spray nozzles that are spraying the barrier composition continuously or intermittently onto the cellulose blank structure 2. In this way, the barrier composition is applied onto the cellulose blank structure 2 in the barrier application module. The barrier composition may be applied on only one side of the cellulose blank structure or alternatively on both sides. The barrier composition may further be applied over the whole surface or surfaces of the cellulose blank structure 2, or only on parts or zones of the surface or surfaces of the cellulose blank structure 2. The hood structure of the barrier application module is preventing the barrier composition from being spread into the surrounding environment. Other application technologies for applying the barrier structure may for example include slot coating and/or screen-printing.

The feeding route and feeding direction of the cellulose blank structure 2 of the example embodiment of FIG. 1 is for clarification purposes schematically illustrated in FIG. 5*a*, and the compact configuration and layout of the product forming unit U enabled by routing the cellulose blank structure 2 first primarily upwards, then primarily horizontal and subsequently primarily downwards is clearly understandable, when compared with a conventional straight line horizontal routing of a cellulose product compression forming process.

Figure 5A:
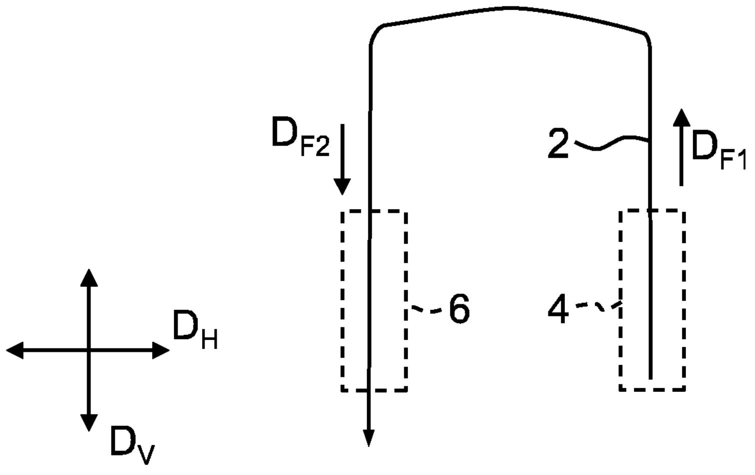
FIG. 5*a-b* show schematically, two example embodiments of routing of a cellulose blank structure within the product forming unit, according to the disclosure.
Figure 5B:
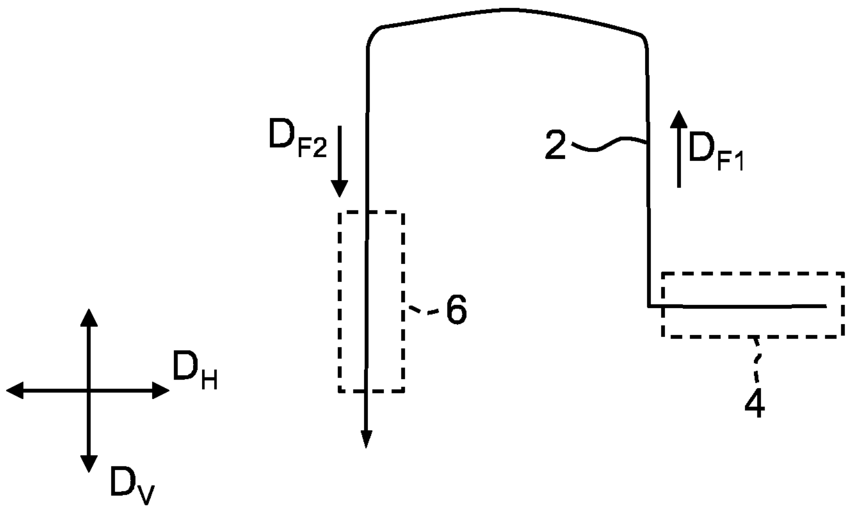

Alternatively, the blank dry-forming module 4 may be arranged to have a primarily horizontal orientation of the feeding route and feeding direction of the cellulose blank structure 2, with a primarily horizontal orientation of the forming wire in the area of the forming chamber opening, as schematically illustrated in FIG. 5*b*, before routing the cellulose blank structure 2 upwards, then primarily horizontal and subsequently primarily downwards to the pressing module 6. This layout of the product forming unit U may also be used for providing a compact product forming unit U.

With reference to FIGS. 5*a-b*, the blank dry-forming module 4 typically forms the start of the feeding route and the pressing module 6 typically forms the end of the feeding route, when not taking a blank recycling module 7 into account. Other modules, such as the barrier application module are located at suitable positions between the dry-forming module 4 and the pressing module 6, downstream the dry-forming module 4 and upstream the pressing module 6.

The primarily downwards routing of the cellulose blank structure while passing the pressing module 6 is beneficial in terms of simplified feeding of the cellulose blank structure 2, as well as simplified cellulose products 1 removal after completed forming process upon leaving the pressing module 6.

Specifically, high-speed intermittent feeding of the cellulose blank structure 2 from the blank dry-forming module 4 to the pressing module 6 may be difficult to accomplish without damaging or altering the characteristics of the cellulose blank structure 2, such as the thickness of the cellulose blank structure 2, or the like. However, by arranging the toggle press in a primarily horizontal direction $D_H$ and feeding the cellulose blank structure primarily downwards to the pressing module 6, the gravitational force assists this feeding process, thereby requiring less force to be applied by a feeding device for feeding the cellulose blank structure 2 into the pressing area $A_P$ of the pressing module 6, and thereby reducing the risk for damages and/or altered characteristics of the cellulose blank structure 2.

Moreover, removal of the finished and ejected cellulose products 1 after completed forming process may also be simplified by means of the primarily vertical routing of the cellulose blank structure 2 through the forming mold 3, because the gravitational force may also here assist and simply removal of the finished and ejected cellulose products 1 from the forming mold 3, and subsequent transportation to a storage chamber, conveyer belt, or the like.

Further, in the embodiments illustrated in FIGS. 1 and 6, the product forming unit U comprises a blank recycling module 7 for recycling cellulose fibers. The blank recycling module 7 is configured for transporting residual parts 2*c* of the cellulose blank structure 2 after forming of the cellulose products 1, from the pressing module 6 back to the blank dry-forming module 4. The blank recycling module 7 is arranged for transporting residual cellulose blank fiber material from the pressing module 6 to the mill 4*a*. After forming of the cellulose products 1 in the forming molds 3, there may be residual parts 2*c* of the cellulose blank structure containing cellulose blank fiber material. With the blank recycling module 7, the residual or remaining cellulose fibers can be recycled and re-used for forming a new cellulose blank structure 2 together with fibers from the cellulose raw material. In FIG. 1, an example embodiment of a blank recycling module 7 is schematically illustrated. The blank recycling module 7 comprises a feeding structure 7*a*, such as feeding belts, a conveyer structure, or other suitable means for transporting the residual parts 2*c* from the forming molds 3 to the mill 4*a*. The mill 4*a* may be arranged with a separate inlet opening for the residual material, where the residual parts 2*c* of the cellulose blank structure 2 are fed into the mill 4*a*.

The blank recycling module 7 may comprise a recycling compacting unit 7*b*. The recycling compacting unit 7*b* is compacting the residual parts 2*c* of the cellulose blank structure 2 upon transportation from the pressing module 6 to the blank dry-forming module 4. Suitably, the recycling compacting unit 7*b* is arranged as a pair of cooperating rollers that are compacting the residual parts 2*c* of the cellulose blank structure 2, as shown in FIG. 1.

In a non-illustrated embodiment, the blank recycling module 7 may instead comprise a channel structure with an inlet portion arranged in connection to the forming molds 3, and the residual parts 2_c_ of the cellulose blank structure can be sucked into the inlet portion for further transportation to the mill 4_a_. The channel structure may further be arranged with a suitable combined mill and fan unit, which is used for at least partly separate the residual material before further transportation to an outlet portion in connection to the mill 4_a_.

The product forming unit U may further comprise transportation or feeding devices for intermittently feeding the cellulose blank structure 2 between the different modules. The transportation devices may be arranged as conveyor belts, vacuum belts, or similar devices for an efficient transportation. According to some example embodiments, the feeding devices may include elongated vacuum belt feeders, elongated tractor belt feeders or the like.

With the modules described above, a compact construction of the product forming unit U is enabled, and the modules may be integrated into one single product forming unit U that is possible to ship in a freight container, and placed on a converter's plant floor in a simple manner. The differing feeding directions enable a more compact layout and construction of the product forming unit U.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of the control system, the one or more programs comprising instructions for performing the method according to any one of the above-discussed embodiments.

Alternatively, according to another exemplary embodiment a cloud computing system can be configured to perform any of the method aspects presented herein. The cloud computing system may comprise distributed cloud computing resources that jointly perform the method aspects presented herein under control of one or more computer program products. Moreover, the processor may be connected to one or more communication interfaces and/or sensor interfaces for receiving and/transmitting data with external entities such as e.g. sensors, an off-site server, or a cloud-based server.

The processor or processors associated with the control system may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims. Reference signs mentioned in the claims should not be seen as limiting the extent of the matter protected by the claims, and their sole function is to make claims easier to understand.

The invention claimed is:

1. A method for dry-forming cellulose products from a cellulose blank structure in a product forming unit, wherein the product forming unit comprises a blank dry-forming module and a pressing module, wherein the cellulose blank structure is air-formed in the blank dry-forming module onto a forming wire, wherein the pressing module comprises one or more forming molds for forming the cellulose products from the cellulose blank structure in a pressing operation, wherein the method comprises the step of:

arranging the forming wire in a stationary mode during the pressing operation, wherein the pressing module is a cellulose product toggle pressing module for forming the cellulose products from the cellulose blank structure, wherein the method further comprises the steps of;

providing the cellulose product toggle pressing module having a toggle press and the one or more forming molds, wherein the toggle press includes a pressing member movably arranged in a pressing direction, a toggle-mechanism connected to the pressing member, a pressing actuator arrangement connected to the toggle-mechanism, and an electronic control system operatively connected to the pressing actuator arrangement, and wherein the one or more forming molds each includes a movable first mold part attached to the pressing member and a stationary second mold part, installing the toggle press with the pressing direction of the pressing member arranged primarily in a horizontal direction, with the pressing direction in parallel with the horizontal direction, feeding the cellulose blank structure into a pressing area defined by the first and second, spaced apart, mold parts, controlling operation of the pressing actuator arrangement by the electronic control system for driving the pressing member using the toggle-mechanism in the pressing direction and forming the cellulose products from the cellulose blank structure by pressing each first mold part against the stationary second mold part.

2. The method according to claim 1, wherein in the stationary mode the forming wire is arranged in a standstill state, wherein the duration of the standstill state is synchronized with the duration of the pressing operation such that the standstill state is occurring during the pressing operation.

3. The method according to claim 1,
wherein the stationary mode is followed by a transporting mode, wherein in the transporting mode the forming wire is arranged in a moving state, wherein the method further comprises the step of: moving the air-formed cellulose blank structure away from the blank dry-forming module by the forming wire in the moving state.

4. The method according to claim 3,
wherein in the moving state is at least partly occurring between two subsequent pressing operations.

5. The method according to claim 1,
wherein the cellulose blank structure is air-formed in the dry-forming module into a discrete cellulose blank, or wherein the cellulose blank structure is air-formed in the dry-forming module into a continuous cellulose blank.

6. The method according to claim 1,
wherein the method further comprises the steps of: forming the cellulose products from the cellulose blank structure in the one or more forming molds by heating the cellulose blank structure to a forming temperature; and pressing the cellulose blank structure with a forming pressure in the pressing operation.

7. The method according to claim 6, wherein the forming temperature is in the range of 100-300° C., and the forming pressure is in the range of 1-100 MPa.

8. The method according to claim 1, wherein the pressing operation is a single pressing operation.

9. The method according to claim 1, wherein the method further comprises the step of: transporting the air-formed cellulose blank structure from the blank dry-forming module to the pressing module.

10. The method according to claim 1, wherein the cellulose blank structure is intermittently transported from the blank dry-forming module to the pressing module.

11. The method according to claim 10,
wherein the cellulose blank structure is intermittently transported from the blank dry-forming module by the forming wire in a first feeding direction, and intermittently transported to the pressing module in a second feeding direction, wherein the second feeding direction differs from the first feeding direction.

12. The method according to claim 11,
wherein the first feeding direction is opposite to, or essentially opposite to, the second feeding direction.

13. The method according to claim 11,
wherein the first feeding direction is an upwards direction and the second feeding direction is a downwards direction.

14. The method according to claim 1, wherein the method further comprises the steps of: providing a cellulose raw material and feeding the cellulose raw material to the blank dry-forming module; and air-forming the cellulose blank structure from the cellulose raw material in the blank dry-forming module onto the forming wire.

15. The method according to claim 14,
wherein the blank dry-forming module further comprises a mill and a forming chamber, wherein the forming wire is arranged in connection to the forming chamber, wherein the method further comprises the steps of: separating cellulose fibers from the cellulose raw material in the mill; and distributing the separated cellulose fibers into the forming chamber onto the forming wire for air-forming the cellulose blank structure.

16. The method according to claim 15,
wherein the method further comprises the steps of: continuously operating the mill; and continuously feeding the cellulose raw material to the mill, or intermittently feeding the cellulose raw material to the mill.

17. The method according to claim 15, wherein the forming wire comprises a forming section arranged in connection to a forming chamber opening of the forming chamber, wherein the method further comprises the step of: air-forming the cellulose blank structure onto the forming section.

18. The method according to claim 17,
wherein the forming section is extending in an upwards blank forming direction, wherein the method further comprises the steps of: air-forming the cellulose blank structure onto the forming section; and transporting the formed cellulose blank structure by the forming wire in the upwards blank forming direction.

19. The method according to claim 17,
wherein the forming section is extending in a horizontal blank forming direction, wherein the method further comprises the steps of: air-forming the cellulose blank structure onto the forming section; and transporting the formed cellulose blank structure by the forming wire in the horizontal blank forming direction.

20. The method according to claim 15, wherein the forming wire has a first side facing the forming chamber and a second side facing a vacuum box arranged in connection the forming chamber, wherein the vacuum box is configured for controlling the flow of air in the forming chamber and for distributing the separated cellulose fibers onto the forming wire, wherein the method further comprises the steps of: air-forming the cellulose blank structure onto the first side of the forming wire; applying a negative pressure onto the second side for securing attachment of the cellulose fibers onto the first side.

21. The method according to claim 1, wherein the product forming unit comprises a blank recycling module, wherein the method further comprises the step of: transporting residual parts of the cellulose blank structure from the pressing module to the blank dry-forming module.

22. The method according to claim 21,
wherein the blank recycling module comprises a recycling compacting unit, wherein the method further comprises the step of: compacting the residual parts of the cellulose blank structure in the recycling compacting unit upon transportation from the pressing module to the blank dry-forming module.

23. A product forming unit for dry-forming cellulose products from a cellulose blank structure, wherein the product forming unit comprises:
a blank dry-forming module; and
a pressing module, wherein the cellulose blank structure is air-formed in the blank dry-forming module onto a forming wire, wherein the pressing module comprises one or more forming molds configured for forming the cellulose products from the cellulose blank structure in a pressing operation, wherein the blank dry-forming module is configured for arranging the forming wire in a stationary mode during the pressing operation, wherein the pressing module is a cellulose product toggle pressing module for forming the cellulose products from the cellulose blank structure, wherein the product forming unit is configured to:
provide the cellulose product toggle pressing module having a toggle press and the one or more forming molds, wherein the toggle press includes a pressing member movably arranged in a pressing direction, a toggle-mechanism connected to the pressing member, a pressing actuator arrangement connected to the toggle-mechanism, and an electronic control system operatively connected to the pressing actuator arrangement, and wherein the one or more forming molds each includes a movable first mold part attached to the pressing member and a stationary second mold part, install the toggle press with the pressing direction of the pressing member arranged primarily in a horizontal direction, with the pressing direction in parallel with the horizontal direction, feed the cellulose blank structure into a pressing area defined by the first and second, spaced apart, mold parts, control operation of the pressing actuator arrangement by the electronic control system for driving the pressing member using the toggle-mechanism in the pressing direction and forming the cellulose products from the cellulose blank structure by pressing each first mold part against the stationary second mold part.

* * * * *